United States Patent Office 2,805,949
Patented Sept. 10, 1957

2,805,949
POULTRY FEED

Robert W. Colby, Lake Jackson, Tex., and Robert J. Mesler, Jr., Midland, Mich., assignors to The Dow Chemical Company, Midland, Mich., a corporation of Delaware No Drawing. Application October 29, 1954, Serial No. 465,733

4 Claims. (Cl. 99—4)

This invention is concerned with an improvement in poultry husbandry and is particularly directed to a novel poultry feed composition and a method for accelerating the growth of poultry.

According to the present invention, it has been discovered that the growth of poultry is accelerated by feeding the poultry a feed composition supplemented with a polyglycol-dibutylphenyl monoether. The supplemented feed has been found particularly advantageous as a ration for young chickens. It is among the advantages of the invention that the weight gains resulting from the consumption of the supplemented feed are accompanied by increased feed efficiency; that is, the food is better utilized so that the consumption in pounds of feed per pound of weight gained by the fowl is lower than with unsupplemented feed.

The polyglycol-dibutylphenyl monoethers effective in the invention are those prepared by reacting ethylene oxide with a dibutylphenyl monoether of a tri-, tetra- or pentapropylene glycol. In such reactions, the ethylene oxide is employed in amount sufficient to render the polyglycol ether product water-miscible and, in general, in amount equivalent to from about 40 to 60 percent by weight based on the finished product. These polyglycol ethers are readily prepared by known methods, as disclosed, for example, in U. S. Patents 2,174,761 and 2,677,700. They are viscous liquids readily soluble in benzene and water and of relatively low solubility in aliphatic hydrocarbons. Preferred polyglycol ethers for use in the invention are prepared by reacting one mole of a dibutylphenyl monoether of tetrapropylene glycol with from 8 to 10 moles of ethylene oxide.

The feed compositions of the invention may be prepared in any suitable fashion, provided that the polyglycol-dibutylphenyl monoether is intimately admixed with the poultry nutrients. For example, the polyglycol ether is dissolved in a solvent and the resulting solution distributed over the feed while the latter is rolled or tumbled in a mixer. Alternatively, the polyglycol ether is added during a mixing or milling step in the preparation of a pre-mixed feed. A convenient procedure is to prepare a concentrate by thoroughly admixing an aqueous solution of the polyglycol ether with a portion of the feed and then blending the concentrate with the remainder of the feed. Such concentrates may contain from about 1 to 4 percent or more by weight of the polyglycol ether.

In general, an effective amount of the polyglycol ether added to the feed is from about 0.01 to about 0.3 percent by weight of the total feed on an air-dry basis, preferably about 0.05 to about 0.1 percent by weight.

The following examples illustrate the invention but are not to be construed as limiting the same:

Example 1

173 parts by weight of 2,4-disecondarybutyl-phenol was reacted with 2.2 parts of sodium under an atmosphere of nitrogen in a pressure kettle. The resulting mixture was heated to a temperature of 125°–150° C. and 195 parts of propylene oxide added thereto with stirring and at such a rate as to maintain autogenous pressure of about 25 to 35 pounds gauge during a period of about one hour. On completion of the reaction, as evidenced by the decrease of gauge pressure to about zero, 332 parts of ethylene oxide were added under the same conditions as with the propylene oxide. When the reaction was complete, the product was cooled to about 75°, bubbled with $CO_2$ and filtered to obtain a polyglycol-dibutylphenyl monoether as a viscous liquid, soluble in benzene and water, insoluble in heptane and having a specific gravity of 1.043 at 25° C. and a cloud point of 48°–49° C. for a 10 percent aqueous solution thereof. This polyglycol ether comprises a major proportion of a derivative containing 8 oxyethylene moieties per mole of tetrapropylene glycol-disecondarybutylphenyl monoether.

One part by weight of the above polyglycol ether was dissolved in sufficient water to yield a solution of relatively low viscosity. This solution was added portionwise to from 20 to 40 parts of a commercial mixed poultry feed while the latter was being agitated in a mechanical mixer to prepare a concentrate. Mixing was continued until a substantially uniform dispersion of the polyglycol ether throughout the concentrate was obtained. The concentrate was then admixed in a large rotary mixer with sufficient of the mixed poultry feed to produce 1000 parts of supplemented feed composition containing 0.1 percent by weight of the polyglycol ether. The commercial mixed feed employed above was considered a balanced normal feed ration and had the following composition:

| Ingredients | Parts by Weight |
|---|---|
| Ground yellow corn | 61.15 |
| Pulverized oats | 2.5 |
| Fish meal (60–70 percent protein) | 2.5 |
| A and D feeding oil | 0.3 |
| Iodized salt | 0.5 |
| Oyster shell flour | 0.5 |
| Steamed bone meal | 2.5 |
| Alfalfa meal | 2.0 |
| Soybean meal (44 percent protein) | 26.0 |
| DL-Methionine | 0.05 |
| Vitamin and minor element concentrate | 2.0 |

The supplemented feed composition was fed ad libitum to a group of 40 mixed sex, day-old New Hampshire chicks. The chicks were kept in heated brooders until they reached four weeks of age and then transferred to unheated metal coops. The weights of the birds and total weight of feed consumed were determined when the birds were ten weeks old. As controls or checks, another group of 40 chicks from the same lot were similarly maintained and fed ad libitum with the balanced mixed feed composition without supplementation. In the ten week period the birds eating the supplemented feed attained a mean weight of 3.23 pounds per bird while that of the controls was 3.09 pounds per bird. This weight amounted to a 4.5 percent increase over the mean weight of the control birds. The feed consumed per pound of gain was 3.3 percent less for the birds fed the supplemented composition than for the control birds fed the unmodified commercial feed. This corresponds to an increase of 3.3 percent in feed efficiency.

Example 2

0.5 part by weight of the polyglycol ether of Example 1 was admixed with the commercial mixed feed as in the preceding example to prepare a supplemented feed containing 0.05 percent by weight of the polyglycol ether. The latter composition was employed in feeding tests carried out as in Example 1 with a group of cockerel chicks for a period of nine weeks. It was found that the chicks fed the supplemented composition had a mean weight 3.8 percent greater than the mean weight of the chicks fed the unsupplemented diet.

*Example 3*

174 parts by weight of 2,4-ditertiarybutyl-phenol, 2 parts of sodium, 196 parts of propylene oxide and 388 parts of ethylene oxide were reacted according to the procedure of Example 1 to produce a polyglycol-ditertiarybutylphenyl monoether as a viscous liquid soluble in water and benzene, insoluble in heptane and having a specific gravity of 1.042 at 25° C. and a cloud point of 49°–50° C. for a 10 percent aqueous solution thereof. A supplemented feed composition containing 0.1 percent by weight of the above polyglycol ether was prepared as in Example 1 and fed to a group of day-old New Hampshire cockerel chicks following the procedure of the preceding examples. In a ten-week period the birds eating the supplemented feed attained a mean weight of 3.47 as compared to a weight of 3.21 pounds per bird for the group fed the unsupplemented balanced mixed feed. This amounted to a 8.1 percent increase for the chicks fed the supplemented diet over the mean weight of the control birds.

We claim:

1. A poultry feed composition which comprises poultry nutrients and in intimate admixture therewith a polyglycol-dibutylphenyl monoether in an amount effective for accelerating the growth of poultry, said polyglycol ether being prepared by reacting a compound selected from the group consisting of the dibutylphenyl monoethers of tripropylene glycol, tetrapropylene glycol and pentapropylene glycol with an amount of ethylene oxide equivalent to form about 40 to 60 percent by weight of the finished product.

2. A composition according to claim 1 wherein the polyglycol ether is employed in the amount of from about 0.01 to about 0.3 percent by weight of the feed.

3. In poultry husbandry, the method which comprises incorporating as a supplement in normal poultry feed for young chickens a polyglycol-dibutylphenyl monoether in an amount sufficient to accelerate the growth of poultry fed therewith, said polyglycol ether being prepared by reacting a compound selected from the group consisting of the dibutylphenyl monoethers of tripropylene glycol, tetrapropylene glycol and pentapropylene glycol with an amount of ethylene oxide equivalent to from about 40 to 60 percent by weight of the finished product.

4. A method according to claim 3 wherein the polyglycol-dibutylphenyl monoether is employed in the amount of from about 0.01 to about 0.3 percent by weight based on the total weight of the supplemented feed composition.

References Cited in the file of this patent

UNITED STATES PATENTS

| 2,340,063 | Lamb | Jan. 25, 1944 |
| 2,674,619 | Lundsted | Apr. 6, 1954 |
| 2,677,700 | Jackson et al. | May 4, 1954 |

OTHER REFERENCES

Science News Letter, March 15, 1952, page 164.